United States Patent
Hung

(10) Patent No.: US 7,515,754 B2
(45) Date of Patent: Apr. 7, 2009

(54) IMAGE CONTROL APPARATUS, IMAGE CONTROL METHOD AND PROGRAM

(75) Inventor: Po-Chieh Hung, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 878 days.

(21) Appl. No.: 10/999,762

(22) Filed: Nov. 30, 2004

(65) Prior Publication Data

US 2005/0125454 A1 Jun. 9, 2005

(30) Foreign Application Priority Data

Dec. 4, 2003 (JP) ............................. 2003-405931

(51) Int. Cl.
*G06K 9/68* (2006.01)
*G06K 9/62* (2006.01)

(52) U.S. Cl. ...................... 382/218; 382/209

(58) Field of Classification Search ................ 382/181, 382/190, 209, 218, 224–225, 305; 358/403; 707/1–10, 104.1
See application file for complete search history.

(56) References Cited

U.S. PATENT DOCUMENTS

| 6,345,109 | B1 | 2/2002 | Souma et al. |
| 6,396,963 | B2 * | 5/2002 | Shaffer et al. ............... 382/305 |
| 6,744,935 | B2 * | 6/2004 | Choi et al. ................. 382/305 |
| 6,754,675 | B2 * | 6/2004 | Abdel-Mottaleb et al. ........ 707/104.1 |
| 6,813,395 | B1 * | 11/2004 | Kinjo ......................... 382/305 |
| 2001/0046330 | A1 * | 11/2001 | Shaffer et al. ............... 382/284 |
| 2002/0178135 | A1 | 11/2002 | Tanaka |
| 2003/0195883 | A1 | 10/2003 | Mojsilovic et al. |
| 2004/0264810 | A1 * | 12/2004 | Taugher et al. .............. 382/305 |

FOREIGN PATENT DOCUMENTS

JP 2001-319231 11/2001

OTHER PUBLICATIONS

English Abstract for JP 2001-319231 dated Nov. 16, 2001.
European Search Report for Application No. 04028269.1-1228 dated Mar. 1, 2005.
English Abstract for Japanese Application No. 2000276484 dated Oct. 6, 2000.
L. Wenyin et al.: "MiAlbum-A System for Home Photo Management Using the Semi-Automatic Image Annotation Approach" Proceedings ACM Multimedia 2000 Workshops. Marina Del Rey, CA, Nov. 4, 2000, ACM International Multimedia Conference, New York, NY: ACM, US, vol. Conf. 8, pp. 479-480.

* cited by examiner

*Primary Examiner*—Daniel G Mariam
(74) *Attorney, Agent, or Firm*—Cantor Colburn LLP

(57) ABSTRACT

An image control apparatus having an image database storing plural pieces of image information, for controlling the plural pieces of image information, the image control apparatus including: a first image information acquiring device for acquiring first image information; a second image information acquiring device for acquiring second image information; a similarity determining section for determining a similarity through comparison between the first image information and the second image information; and an associating information generating section for generating associating information to associate the first image information with the second image information, based on a judgment result of the similarity determining section, wherein the plural pieces of image information are controlled based on the associating information generated by the associating information generating section.

8 Claims, 7 Drawing Sheets

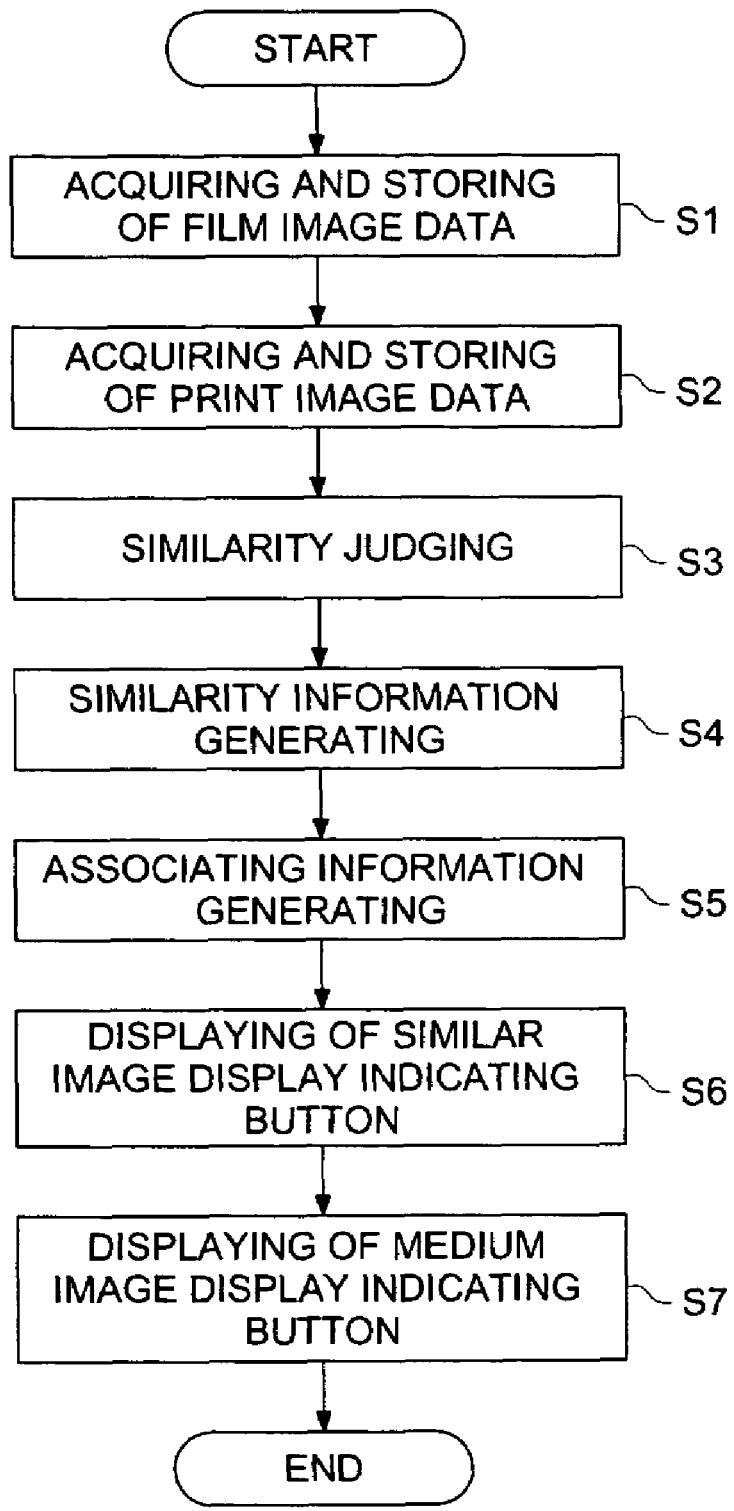

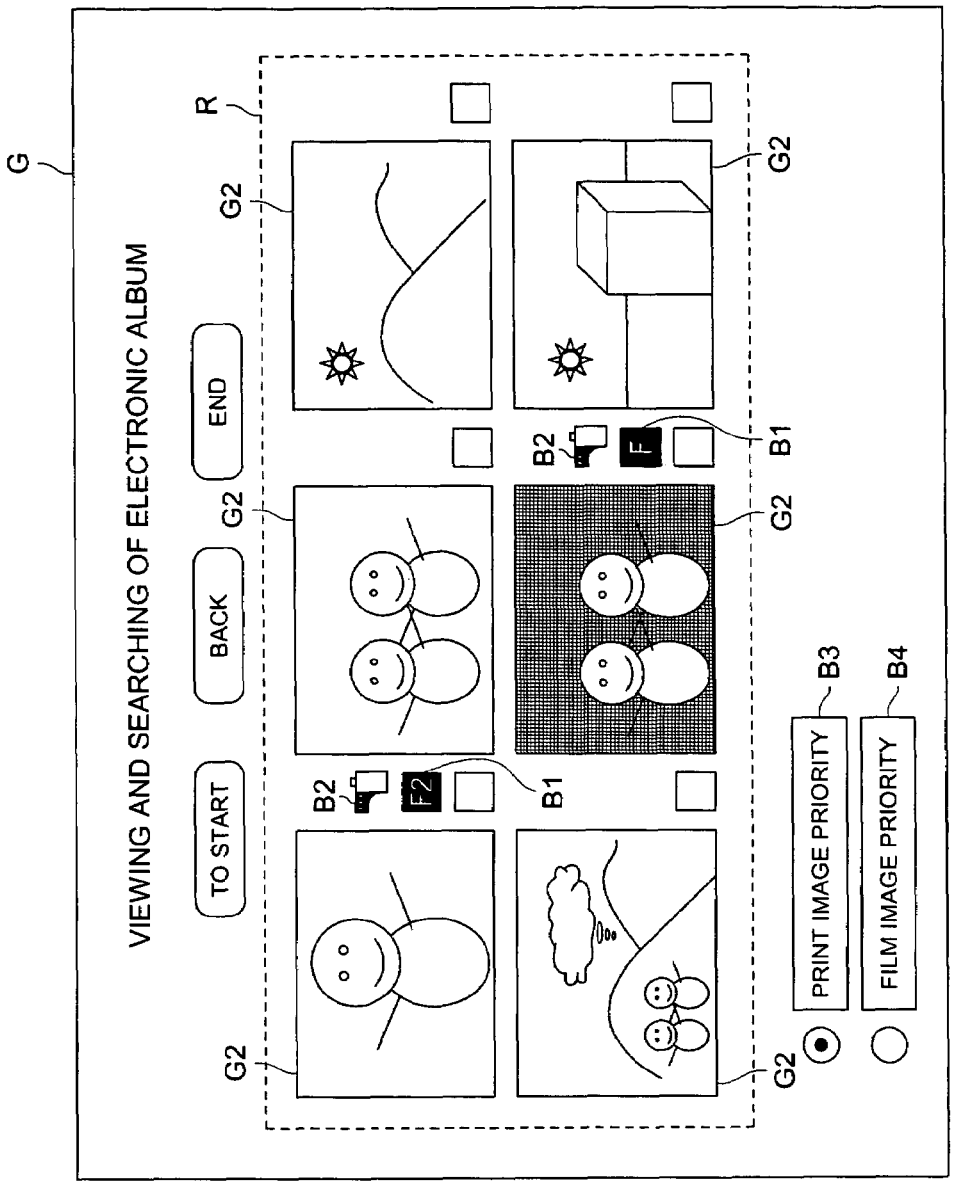

FIG. 5

```
<?xml version="1.0" encoding="UTF-8"?>
      ⋮
<album:Still album:id="ID001001">
   <album: Print>../IMAGE/PS20030731_printalbum1/PICT1001.JPG</album: Print>
   <album: Film1>
       <file>../IMAGE/PS19640401_film/PICT0838.JPG</file>
       <similarity>80</similarity>      A
   </album: Film1>
   <album: Film2>
       <file>../IMAGE/PS19710330_film/PICT1433.JPG</file>
       <similarity>50</similarity>      A
   </album: Film2>
</album: Still>

<album:Still album:id="ID001002">
   <album: Print>../IMAGE/PS20030731_printalbum1/PICT1002.JPG</album: Print>
</album:Still>

<album:Still album:id="ID001003">
   <album: Print>../IMAGE/PS20030731_printalbum1/PICT1003.JPG</album: Print>
</album:Still>

<album:Still album:id="ID001004">
   <album: Print>../IMAGE/PS20030731_printalbum1/PICT1004.JPG</album: Print>
</album:Still>

<album:Still album:id="ID001005">
   <album: Print>../IMAGE/PS20030731_printalbum1/PICT1005.JPG</album: Print>
   <album: Film1>

<file>../IMAGE/PS19710731_film/PICT1523.JPG</file>
       <similarity>80</similarity>      A
   </album: Film1>
</album:Still>

<album:Still album:id="ID001006">
   <album: Print>../IMAGE/PS20030731_printalbum1/PICT1006.JPG</album: Print>
   <album:Still>
      ⋮
```

IMAGE CONTROL APPARATUS, IMAGE CONTROL METHOD AND PROGRAM

BACKGROUND OF THE INVENTION

The present invention relates to an image control apparatus, image control method and program.

In recent years, there are known image control apparatuses, which control images after preserving plural image data in electronic albums.

With reference to this image control apparatus, when thousands frames of film images preserved at home are added to an electronic album, for example, a large number of films or albums with printed images are scanned first with a film scanner or a print scanner to be digitized, and the digitized image data are stored in electronic albums.

Now, there has been proposed a technology wherein, when image data are added to image database, if an image, which is similar to or the same as an image to be newly stored, has already been stored in the image database, the storage of the image data (double registration) is prevented. (For example, Refer to Patent Document 1.)

[Patent Document 1] TOKKAI No. 2001-319231

However, according to the Patent Document 1 mentioned above, when an image to be stored anew is similar to, but is different from the image already stored, there is a possibility of deletion of the image by mistake instead of being stored in the image database.

Besides, for example, in the case where there are a large number of image data stored in the image database, and if plural image data related to similar image or nearly identical image are randomly stored, there happens a problem that it becomes impossible to use conveniently the image desired by the user in the image database.

SUMMARY OF THE INVENTION

An object of this invention is to provide an image control apparatus, an image control method and program, which can arrange image data properly in the image database.

Items of the embodiment to achieve the above-mentioned object are as follows:

(1) An image control apparatus having an image database capable of storing plural pieces of image information, for controlling the plural pieces of image information stored in the image database, the image control apparatus comprising: a first image information acquiring device for acquiring first image information; a second image information acquiring device for acquiring second image information; a similarity determining section for determining a similarity (a degree of similarity) through comparison between the first image information acquired by the first image information acquiring device and the second image information acquired by the second image information acquiring device; and an associating information generating section for generating associating information to associate the first image information with the second image information, based on a judgment result of the similarity determining section, wherein the plural pieces of image information are controlled based on the associating information generated by the associating information generating section.

(7) An image controlling method for controlling plural pieces of image information stored in an image database by using an image control apparatus comprising a first image information acquiring device for acquiring first image information and a second image information acquiring device for acquiring second image information, and the image database for storing the first image information and the second image information, the image controlling method comprising: determining a similarity (a degree of similarity) through comparison between the first image information acquired by the first image information acquiring device and the second image information acquired by the second image information acquiring device; generating associating information to associate the first image information with the second image information, based on a judgment result of the step of determining a similarity; and controlling the plural pieces of image information based on the associating information generated by the step of generating associating information.

(8) A program for realizing an image control on an image control apparatus comprising a first image information acquiring device for acquiring first image information, a second image information acquiring device for acquiring second image information, and an image database for storing the first image information and the second image information, the image control comprising the functions of: determining similarity through comparison between the first image information acquired by the first image information acquiring device and the second image information acquired by the second image information acquiring device; generating associating information to associate the first image information with the second image information, based on a judgment result of the step of determining similarity (degree of similarity); and controlling plural pieces of image information based on the associating information generated by the step of generating associating information.

According to the embodiment described in items (1), (7), and (8), associating information associating between first image information and second image information is generated, based on the result of similarity determination between the first image information acquired by a first image information acquiring device and the second image information acquired by a second image information acquiring device, and image information stored in the image database can be controlled based on the generated associating information. Thereby, for example, when the user uses either the first image information or the second image information, the other image information associated with the image information used by the user can be used favorably. As shown above, image data can be arranged properly in the image database.

BRIEF DESCRIPTION OF THE DRAWINGS

FIG. 3 is a flowchart showing an example of actions related to a image control process carried out by the image control apparatus shown in FIG. 1.

FIG. 4 is a specific example of electronic album image area displayed on the display section by image control process shown in FIG. 3.

FIG. 5 is a view explaining linking condition of image data of plural images displayed on display section shown in FIG. 4.

DETAILED DESCRIPTION OF THE PREFERRED EMBODIMENT

Figure 1:
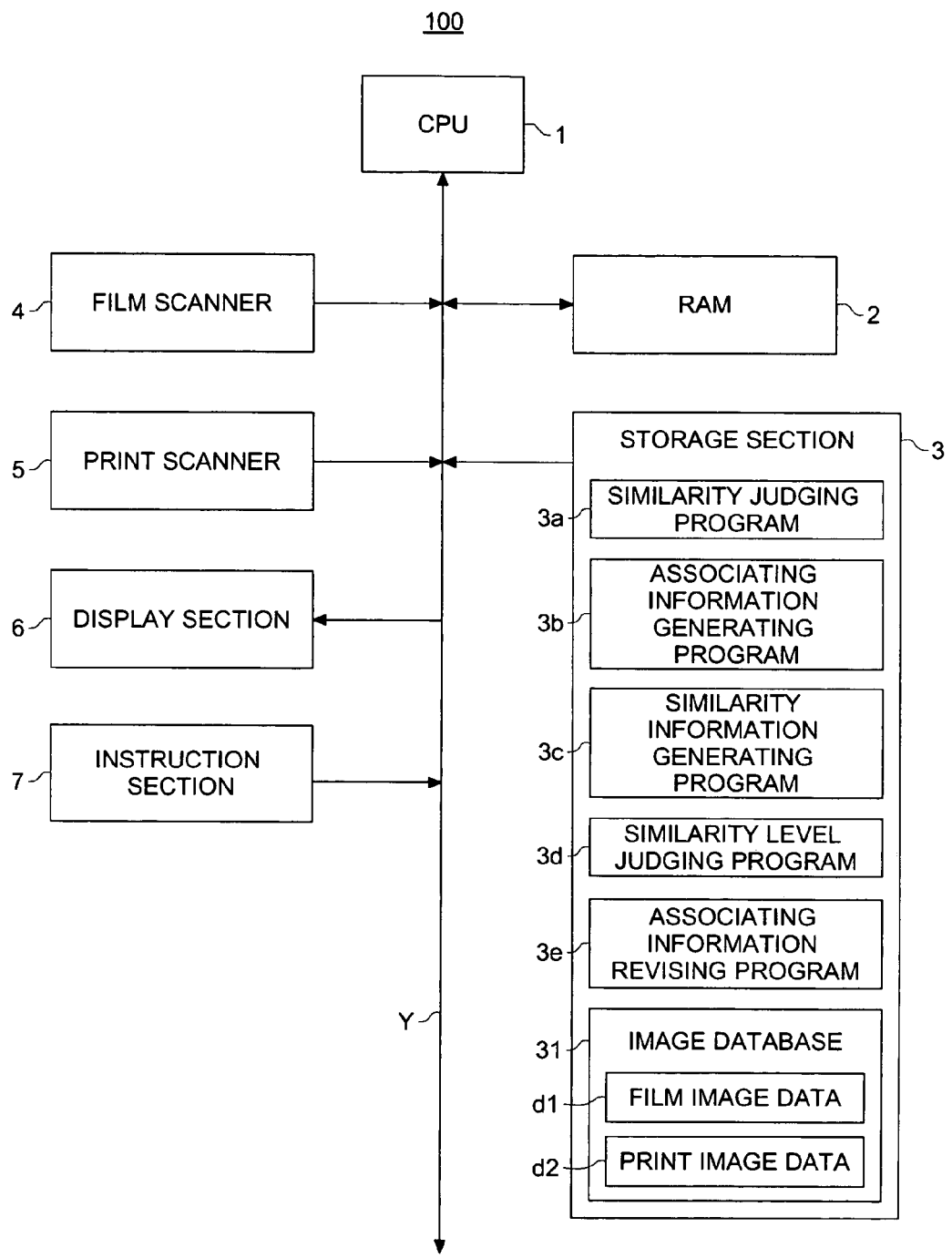
FIG. 1 is a block diagram showing the main portions of composition of the image control apparatus exemplified as an embodiment applied by this invention.

The above-described object can be also achieved by the embodiments of following items.

(2) The image control apparatus of item (1), wherein the second image acquiring device is configured to acquire print image information as the second image information from a print recording medium on which an image is printed, and the first image acquiring device is configured to acquire medium image information as the first image information from a recording medium different from the print recording medium.

According to the embodiment of item (2), print image information can be acquired from print recording media on which images are printed and also medium image information can be acquired from the recording media which are different from the print recording media. That is, image information can be acquired from both print recording media, which are users' common forms of image preservation, and other recording media such as films and memory cards. Therefore, it becomes possible to store print image information and medium image information to be associated with each other, so that the image information arrangement in the image database can be appropriate.

(3) The image control apparatus of item (2), further comprising: a similarity information generating section for generating similarity information related to similarity between the medium image information and the print image information based on the similarity determined by the similarity determining section, wherein the associating information generating section generates the associating information which associates the print image information with the medium image information similar to the print image information, based on the similarity information generated by the similarity information generating section.

According to the embodiment described in item (3), it is naturally possible to get the same effect as in the embodiment described in item (2), and especially similarity information related to similarity between medium image information and print image information is generated, based on judgment result of the similarity between the two pieces of image information and, associating information which associates print image information with medium information similar to this print image information is generated, based on the generated similarity information, therefore, print image information and medium image information can be stored to be associated with each other and arrangement for some pieces of similar image information in the image database can be appropriate.

Besides, it prevents a deletion of image information caused by mistake, which occurred in a conventional technology which prevents double registration.

(4) The image control apparatus of item (3), further comprising: a similarity level judging section for judging which is higher a similarity already determined by the similarity determining section between a first medium image information and a first print information, or a similarity between a newly acquired second medium image information and the first print information; and an associating information revising section for revising the associating information so that an associating degree between the second medium image information and the first print image information becomes higher than associating degree between the first medium image information and the first print image information, when the similarity between the second medium image information and the first print image information is judged to be higher than the similarity between the first medium image information and the first print image information.

According to the embodiment described in item (4), it is naturally possible to get the same effect as in the embodiment described in item (3), and especially, the associating information is revised so that an associating degree between the second medium image information and the first print image information becomes higher than associating degree between the first medium image information and the first print image information, when the similarity between the second medium image information and the first print image information is judged to be higher than the similarity between the first medium image information and the first print image information, and thus, the higher the similarity of the medium image information to the print image information is, the higher the association degree of the medium image information can be, therefore, image information can be arranged more properly in the image database.

(5) The image control apparatus of item 3 or item (4), wherein a displaying section to display image related to the print image information stored in the image database is provided, and the displaying section is configured to display a similar image display instructing mark to instruct to display images related to the medium image information associated with the print image information, based on the associating information generated by the associating information generating section.

According to the embodiment described in item (5), it is naturally possible to get the same effect as the embodiment described in item (3) or (4), and especially, when similar image display instruction mark which is displayed on the displaying section is operated based on user's prescribed operations, images related to medium image information associated with print image information can be displayed on the displaying section. That is, generally, print images on albums deteriorate their image quality by aging, however, recording media like films and memory cards deteriorate the image quality only slightly and often keep image information, the quality of which can be improved by digitization. On the other hand, although print image can be restored by an application of a prescribed image processing, it is difficult to achieve a high quality due to a limit by reason of a noise increase and so on. Therefore, an image which is similar to print image and related to medium image information evaluated as a high quality image, can be displayed on displaying section and images desired by the user can be provided as high quality images.

(6) The image control apparatus of item (5), wherein the image database is provided with medium image memory areas which store plural pieces of the medium image information acquired by the first image information acquiring device to be associated, and the displaying section is configured to display medium image display instruction mark to display images related to the plural pieces of the medium image information stored in the medium image memory area, including the medium image information associated with the print image information.

According to the embodiment described in item (6), it is naturally possible to get the same effect as in the embodiment described in item (5), and especially, when medium image display instruction mark displayed in the displaying section is operated based on user's prescribed operation, image related to plural pieces of medium image information stored in medium image memory area, including medium image information associated with print image information can be displayed on the displaying section. That is, images related to plural pieces of medium image information, which are stored in medium image memory areas and associated with conditions such as time and place-can be displayed and provided to the user so that the image control apparatus is highly intriguing.

Effects of the Invention

According to the embodiment described in item (1), associating information associating between first image information and second image information is generated, based on the result of similarity determination between the first image information acquired by a first image information acquiring device and the second image information acquired by a second image information acquiring device, and image information stored in image database can be controlled based on the generated associating information. Thereby, for example, when the user uses either one of the first image information or the second image information, the other image information associated with the image information used by the user can be used favorably. As shown above, image information can be arranged properly in the image database.

According to the embodiment described in item (2), print image information can be acquired from print recording media on which images are printed and also medium image information can be acquired from the recording media which are different from the print recording media. That is, image information can be acquired from both print recording media, which are users' common forms of image preservation, and other recording media such as films and memory cards. Therefore, it becomes possible to store print image information and medium image information to be associated with each other, so that the image information arrangement in the image database can be appropriate.

According to the embodiment described in item (3), print image information and medium image information similar to this print image information can be stored to be associated with each other in the image database, and arrangement for some pieces of similar image information in the image database can be appropriate.

Besides, it prevents a deletion of image information caused by mistake, which occurred in a conventional technology which prevents double registration According to the embodiment described in item (4), the higher the similarity of the medium image information to the print image information is, the higher the association degree of the medium image information can be, therefore, image information can be arranged more properly in the image database.

According to the embodiment described in item (5), images related to medium image information associated with print image information can be displayed on the displaying section. That is, generally, print images on albums deteriorate their image quality by aging, however, recording media like films and memory cards deteriorate the image quality only slightly and often keep image information, the quality of which can be improved by digitization. On the other hand, although print image can be restored by an application of a prescribed image processing such as color fading, it is difficult to achieve a high quality due to a limit by reason of emphasized scars, noise and so on, which are made by an enlargement of low contrast prints. Therefore, an image which is similar to a print image and related to medium image information evaluated as a high quality image, can be displayed on displaying section and images desired by the user can be provided as high quality images.

According to the embodiment described in item (6), image which is related to plural pieces of medium image information stored in medium image memory area, including medium image information associated with print image information can be displayed on the displaying section. That is, images related to plural pieces of medium image information, which are stored in medium image memory area and is associated with conditions such as time and place can be displayed and provided to the user so that the image control apparatus is highly intriguing.

According to the embodiment described in item (7), associating information which associates between first image information and second image information is generated, based on the result of similarity determination between the first image information acquired by a first image information acquiring device and the second image information acquired by a second image information acquiring device, and image information stored in image database can be controlled based on the generated associating information. Thereby, for example, when the user uses either one of the first image information or the second image information, the other image information associated with the image information used by the user can be used favorably. As shown above, image data can be arranged properly in the image database.

According to the embodiment described in item (8), associating information which associates between first image information and second image information is generated, based on the result of similarity determination between the first image information acquired by a first image information acquiring device and the second image information acquired by a second image information acquiring device, and image information stored in image database can be controlled based on the generated associating information. Thereby, for example, when the user uses either one of the first image information or the second image information, the other image information associated with the image information used by the user can be used favorably. As shown above, image data can be arranged properly in the image database.

Preferred Embodiment of the Invention

Regarding this invention, specific embodimentS will be explained as follows, referring to the drawings hereunder. However, the scope of the invention is not limited to the examples shown in the drawings.

FIG. 1 is a block diagram showing the structure of main portions of the image control apparatus exemplified as an embodiment with the application of this invention.

As shown in FIG. 1, image control apparatus 100 includes CPU 1, RAM 2, storage section 3, film scanner 4, print scanner 5, display section 6 and instruction section 7, and these respective items are connected by bus Y.

CPU (Central Processing Unit) 1 reads out the designated program from various programs stored in storage section 3 and expands it in the work area in RAM 2 so as to carry out each process following this program.

Specifically, CPU 1 compares film image data d1 acquired with film scanner 4 with print image data d2 acquired with print scanner 5, in accordance with similarity determining program 3a, as a step of similarity determination, and judges the similarity (degree of similarity) between these images.

As a similarity determining method, for example, there is given a method to analyze luminance frequency of respective film image data d1 and print image data d2 or to calculate chromaticity information distribution of the respective image data, and thereby to judge the similarity between both image data based on the results of the foregoing. At this time, it is preferable to judge by using information of the central portion excluding information of the portion corresponding to the circumference representing 5% of an assumed-printed image, out of the film image data d1, because many of print images G2 are trimmed. Besides, prescribed image search algorithm (for example, refer to TOKKAI No. 2000-276484) can be used to search for similar images instead of judging the similarity for every image.

In addition to that, template matching can be used utilizing histogram information or shape information for images similar to each other, as the final confirmation of image data similarity determination, since the compositions of the similar images are approximately identical. For the use of the template matching, since there is a slight difference between sizes of the images, the matching performed by changing the magnification of one of the images is preferable. On the other hand, so as to achieve speeding-up of the template matching, it is also possible to compute the projection on X coordinate axis or Y coordinate axis, for example, and to use the computing results (1 dimensional information), instead of using image data including information of 2 dimensional image.

With reference to a similarity determining method, it is not limited to the one shown above, and any methods can be feasible.

As a step of generation of associating information, CPU 1 generates associating information for associating film image data d1 with print image data d2, according to associating information generating program 3b, based on the result of similarity determination between both image data. Regarding the generation of associating information, specifically, CPU 1 first generates the similarity information related to the similarity between film image data d1 and print image data d2, as a step of generation of similarity information, according to similarity information generating program 3c, based on the similarity determination result between the image data. Thereafter, based on the generated similarity information, CPU 1 is configured to generate associating information as a step of generation of associating information.

The generated associating information is stored in the prescribed memory area such as "Album dir." in storage section 3.

When film image data d1 is newly acquired with film scanner 4, CPU 1 judges, as a step of similarity level judgment, according to similarity level judging program 3d, whether or not the similarity between the newly acquired film image data d1 and print image data d2 which has been associated with the prescribed film image data d1 in advance by the associating information is higher than the similarity related to similarity information which has been included in the associating information in advance.

Thereafter, when the similarity related to new film image data d1 is judged to be higher than the similarity related to similarity information included in the associating information in advance, CPU 1 is configured to revise the associating information so as to enhance the degree of the association between new film image data d1 and print image data d2, as a step of revision of associating information in accordance with associating information revising program 3e.

RAM (Random Access Memory) 2 is composed of, for example, a volatile semiconductor memory and is provided with a work area to be used by CPU 1 and a memory area so as to store temporarily various kinds of programs and data, which have been read out-from storage section 3 and can be processed by image control apparatus 100.

Storage section 3 is composed of, for example, hard disc drive and stores programs which are carried out by CPU and related to respective functions and controlling data 1 for image control apparatus 100. Specifically, storage section 3 stores similarity determining program 3a, associating information generating program 3b, similarity information generating program 3c, similarity level judging program 3d and associating information revising program 3e.

Storage section 3 stores the image database 31, which stores film image data d1 and print image data d2 acquired with film scanner 4 and print scanner 5.

This image database 31 stores plural image data with directory structure so as to make reference, operation and control of images be feasible on the electronic album made by, for example, an electronic album creating program operated by CPU 1.

Figure 2:
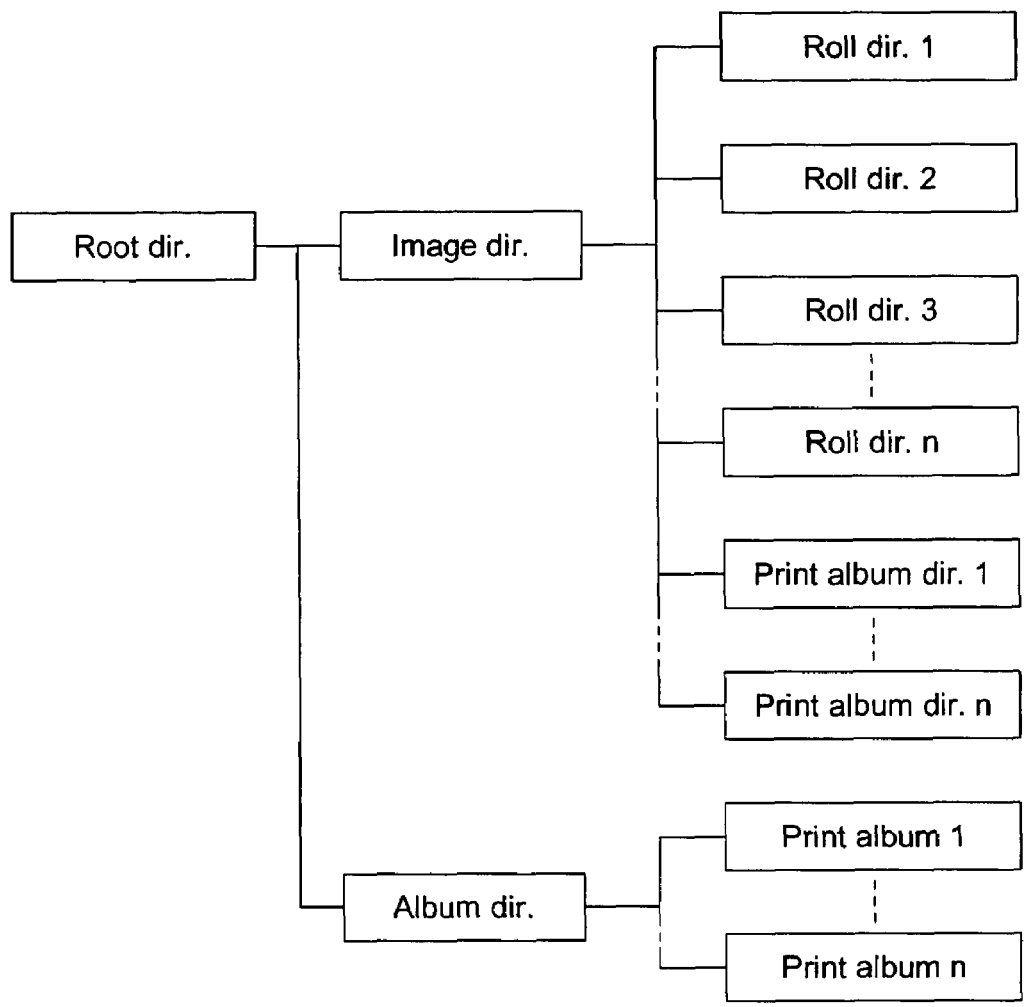
FIG. 2 is a view showing the directory composition of image database stored in the memory installed in the image control apparatus shown in FIG. 1.

Directory structure of image database 31 is explained referring to FIG. 2 hereunder.

As shown in FIG. 2, image database 31 stores directories such as "Image dir.", "Album dir." and so on, which are structured hierarchically under "Root Dir.". "Image dir." stores subdirectories such as "Roll dir. 1"-"Roll dir. n" and "Print Album dir. 1"-"Print Album dir. n".

Each of "Roll dir. 1"-"Roll dir. n" is divided so that each division may correspond to each film roll, and is a directory which stores film image data d1 which corresponds to plural images which have been recorded on each film and acquired by film scanner 4.

Information about photographing time of the image, which is acquired from each film, is stored in each directory. Concretely, for example, information of date which has been inputted as film information during the photographing or information related to approximate year acquired from DX code or film type information marked on the edge of the film by referring to manufacturing information table (Refer to TOKKAI No. 2001-331781) is utilized.

As shown above, each of "Roll dir. 1"-"Roll dir. n" composes a medium image memory area which stores film image data d1 acquired with film scanner 4 to be associated in accordance with photographing time or photographing place.

The number of "Roll dir." is variable according to the number of films scanned by film scanner 4 and is not limited to the number exemplified.

Each of "Print Album dir. 1"-"Print Album dir. n" is divided so that each division may correspond to each file of album and is a directory which stores print image data d2 corresponding to plural images which have been put on each album and acquired with print scanner 5.

The number of "Print Album dir." is variable according to the number of albums scanned by print scanner 5 and is not limited to the number exemplified.

"Album dir." stores associating information related to linking address in "Image dir." of film image data d1 and print image data d2, which are stored into electronic album "Print Album 1"-"Print Album n" created under the control of CPU 1, and also stores similarity information related to similarity between images of these image data. (Refer to FIG. 5; To be described later)

Film scanner 4 composes a step of the first image information acquisition, which acquires film image data d1 (medium image information) as the first image information, and it reads and acquires film image data d1 from each of the plural film images G1 recorded on the film, under the control of CPU 1. The acquired film image data d1 are programmed to be stored into "Roll dir. 1"-"Roll dir. n" in image database 31 of storage section 3 as, for example, Exif format or JPEG2000 format.

Print scanner 5 composes a step of the second image information acquisition, which acquires print image data d2 as the second image information, and it reads and acquires print image data d2 from print images (print record media) G2 which have been made from developed films and stuck on respective pages of albums, under the control of CPU 1.

Print scanner 5 is composed to be able to acquire print image data d2 by section of close-up without peeling off print images G2 from the album pages. Print scanner 5 is composed to be able to change the number of print image data d2 readable in one time according to the form of the album or the location of print image G2 on the album.

Print scanner 5, for example, can be either a flatbed scanner or a three-dimensional object scanner.

Display section 6 includes, for example, LCD (Liquid Crystal Display) and displays, for example, electronic album image area G (Refer to FIG. 4), film image G1 and print image G2 which are stored in image database 31, based on the inputted display control signals which have been outputted from CPU 1.

Display section 6 is configured to display, under control of CPU 1, similar image display instruction mark (similar image display instruction mark) B1, for instructing display of images related to film image data d1 which is associated with print image data d2 based on the associating information and which is similar to print image data d2, in electronic album image area G displayed in display section 6.

Besides, display section 6 is composed to display, under the control of CPU 1, medium image display instruction mark (medium image display instruction mark) B2 for instructing display of images related to plural film image data d1 stored in one of the directories "Roll dir. 1"-"Roll dir. n", including film image data d1 associated with print image data d2, in electronic album image area G.

Instruction section 7 is composed of, for example, a keyboard and a mouse, and outputs to CPU 1, according to the input signals from keystroke operation on the keyboard or from the mouse operation. Specifically, instruction section 7 is composed to be able to output to CPU 1, signals which are related to instruction for the selection of the images, similar image display instruction mark B1 and medium image display instruction mark B2 in electronic album image area G displayed in display section 6.

Instruction section 7 can also be composed of the so-called touch panel, which outputs to CPU 1, position information, which is inputted by touches of fingers or a special stylus pen onto the transparent sheet panel covering display image area of display section 6.

Next, an image control process carried out under the control of CPU 1 will be explained in details referring to FIG. 3.

Figure 6:
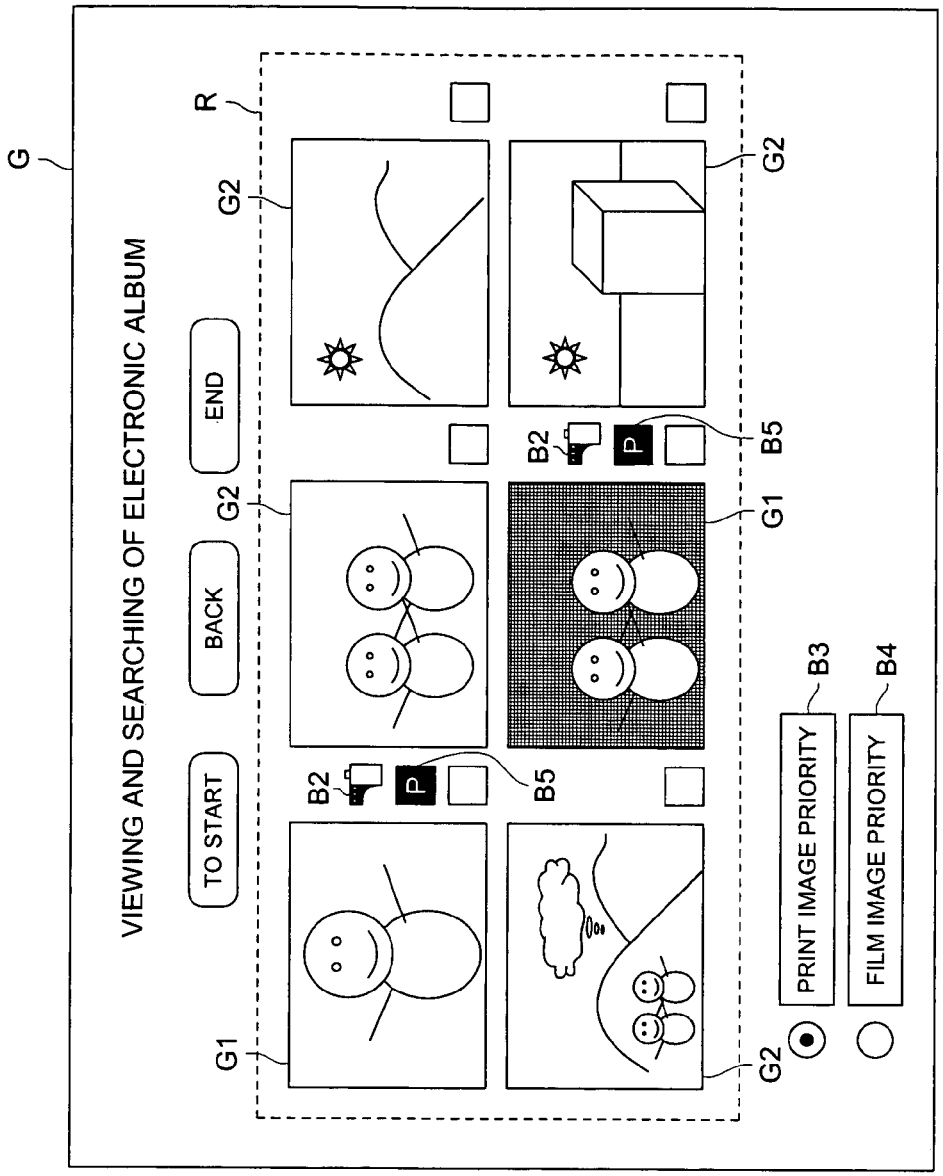
FIG. 6 is a specific example of electronic album image displayed on the display section by image control process shown in FIG. 3.

FIG. 3 is a flowchart showing an example of actions related to an image control process conducted by image control apparatus 100. FIG. 4 shows a specific example of electronic album image area G displayed on display section 6 in an image control process, and FIG. 5 shows a figure explaining the linking condition for image data of plural images displayed on display section 6 shown in FIG. 4. FIG. 6 is a specific example of electronic album image area G displayed on display section 6 in the image control process shown in FIG. 4.

Regarding image control process explained hereunder, images related to print image data d2 acquired with print scanner 5 are assumed to have a priority to be displayed on the electronic album image area G (Refer to FIG. 4). Specifically, it is on condition that print image priority mark B3 shown in FIG. 4 is selected.

As shown in FIG. 3, first, CPU 1 controls film scanner 4 and makes film image data d1 acquired by scanning the film. Next, CPU 1 makes the acquired film image data d1 stored into, for example, "Roll dir. 1" in "Image dir." for each film (Step S1). At this point, CPU 1 makes information of the photographing time stored into respective directories, for images acquired from each film through scanning by film scanner 4.

Next, by controlling print scanner 5, CPU 1 makes the album scanned and print image data d2 acquired. CPU 1 makes the acquired film image data d1 stored into, for example, "Print album dir.1" of "Image dir." for each album (Step S2).

At this point, CPU 1 makes prescribed electronic album image area G (Refer to FIG. 4) displayed by controlling display section 6 and makes images which are related to print image data d2 displayed in this electronic album image area G, in accordance with the order acquired with print scanner 5. That is, images related to print image data d2 are displayed in display section 6 in the same order as in the album.

Although, on the electronic album image area G, 6 images can be displayed simultaneously, the number of displayed images is not limited to this.

Then, CPU 1 reads out similarity determining program 3a from storage section 3 and expands it in RAM 2, and compares every print image data d2 stored in "Print album dir. 1" with film image data d1 stored in "Roll dir. 1", and judges the similarity between these image data, according to similarity determining program 3a (Step S3; similarity determining process). Then, CPU 1 reads out similarity information generating program 3c from storage section 3 and expands it in RAM 2, and generates similarity information related to the similarity between print image data d2 and film image data d1 which is similar to the print image data d2 according to this similarity information generating program 3c, based on the results of the similarity determination between image data (Step S4). At this point, when plural number of candidates for film image data d1 similar to print image data d2 are picked up, CPU 1 functions to generate a similarity information corresponding to each of the candidates.

Next, CPU 1 reads out associating information generating program 3b from storage section 3 and expands it into RAM 2, and generates associating information so as to associate film image data d1 with print image data d2 including the similarity information, based on the generated similarity information, according to the associating information generating program 3b (Step S5; associating information generating process). The generated associating information is stored in "Album dir." in storage section 3.

After generation of associating information, CPU 1 controls display section 6 and makes similar image display instruction mark B1 displayed so as to instruct to display image related to film image data d1 associated with print image data d2 based on associating information, at the prescribed position on electronic album image area G, for example, on right side of print image G2 as shown in FIG. 4 (Step S6). When this similar image display instruction mark B1 is selected based on the user's operation on instruction section 7, film image G1 similar to this print image G2 is displayed by replacing the displayed print image G2 (Refer to FIG. 6).

The figure shown in similar image display instruction mark B1 indicates that there are two film image data d1 similar to print image data d2. In this case, the image data is displayed in the order wherein what has a higher similarity is displayed first, depending on the associating degree between print image data d2 and film image data d1.

With reference to the associating information related to the image displayed on the electronic album image area G shown in FIG. 4, the details will be explained referring to FIG. 5.

As shown in FIG. 5, based on the similarity information (Area A surrounded by broken line in FIG. 5), the associating information is the information which associates print image data d2 with film image data d1 in the manner wherein the higher the similarity of the film image data d1 to the print image data d2 displayed on the electronic album image area G is, the higher the association degree of the film image data d1 with the print image data d2 is. That is, for example, image (<album:Still album:id="ID001001>) displayed on left upper side of image display area R shown in FIG. 4 is associated with film image G1 (<album: Film 1>) of similarity 80% (<Similarity>80</Similarity>) and film image G1 (<album: Film 2>)of similarity 50% (<Similarity>50</Similarity>) to print image G2 (<album:Print>), and the higher the position of the linking address of film image data d1 is, the higher the association degree of the linking address with print image data d2 is.

CPU 1 controls display section 6 and makes medium image display instruction mark B2 displayed at prescribed position on electronic album image area G, for example, above the similar image display instruction mark B1 as shown in FIG. 4, so as to instruct to display images related to plural film image data d1, based on associating information, stored in "Roll dir. 1", including film image data d1, for example (Step S7). After selection of medium image display instruction mark B2 by the user by section of the operation on instruction section 7, images related to plural film image data d1 stored in "Roll dir. 1" are displayed. This makes it possible to display images related to plural film image data d1 associated, for example, with conditions such as time and place stored in "Roll dir. 1" on display section 6 to provide them to the users, and which can make image control apparatus 100 to be highly intriguing.

On the electronic album image area G, for example, in the lower part than display area R of print image G2, there are provided print image priority mark B3 and film image priority mark B4 so as to select images to be displayed preferentially on this electronic album image area G. Then, when film image priority mark B4 is selected by the user's operation on instruction section 7, and if there is film image data d1 similar to print image data d2, the film image data d1 replaces print image data d2 and is displayed, for example, as shown in FIG. 6. On the other hand, print image display instruction mark B5 is displayed instead of similar image display instruction mark B1.

Next, regarding associating information revising process, which is carried out when new film image data d1 is acquired with film scanner 4 under the control of CPU 1, an explanation will be made referring to FIG. 7.

Figure 7:
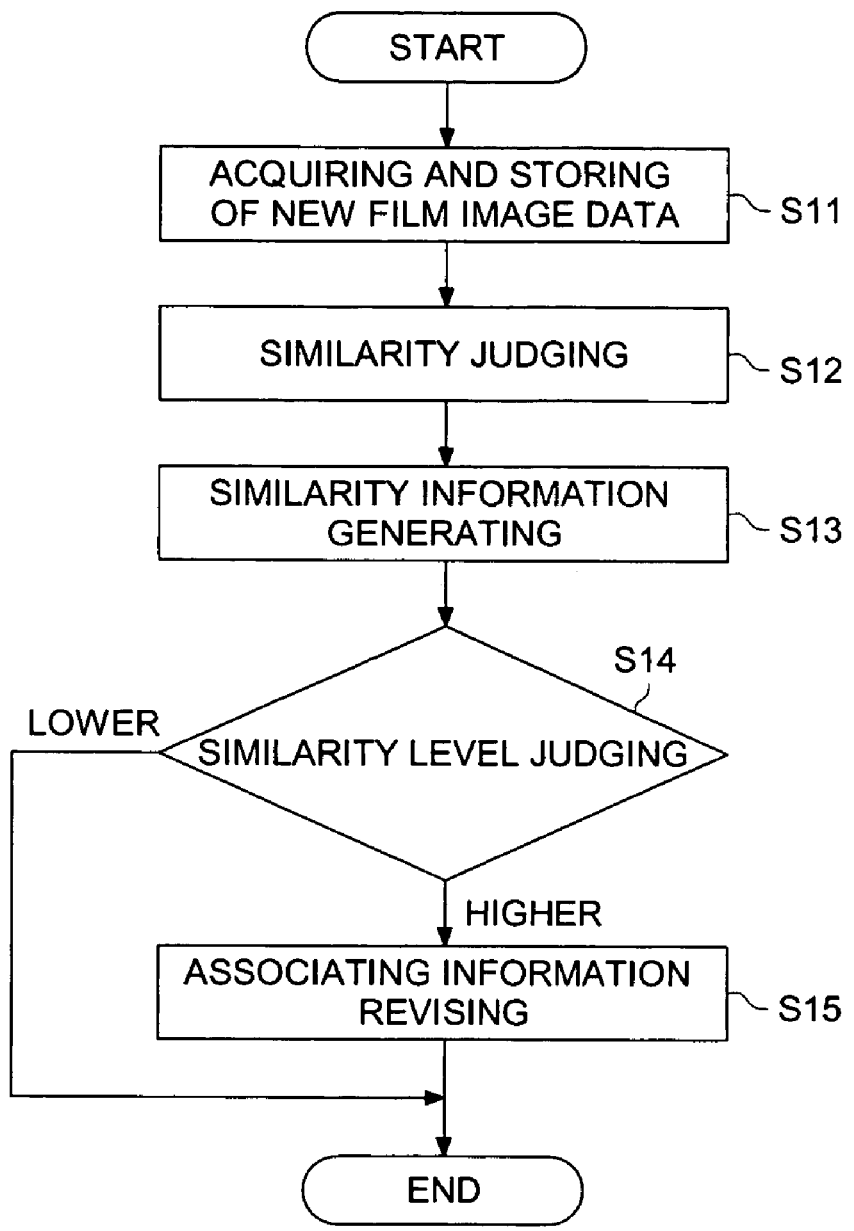
FIG. 7 is a flowchart showing an example of actions related to the associating information revision process by image control apparatus shown in FIG. 3.

The FIG. 7 is a flowchart showing an example of actions related to associating information revising process.

As shown in FIG. 7, by controlling film scanner 4, CPU 1 makes new film image data d1 acquired and the acquired film image data d1 stored into, for example, "Roll dir. 2" of "Image dir." for each film (Step S11).

Then, following the similarity determining program 3a, CPU 1 judges the similarity between newly acquired film image data d1 and print image data d2 associated with the prescribed film image data d1 in advance, according to associating information (Step S12).

CPU 1 generates similarity information related to the similarity between print image data d2 and new film image data d1 similar to this print image data d2, in accordance with similarity information generating program 3c, based on the judgment results of similarity between the images (Step S13)

Next, CPU 1 reads out similarity level judging program 3d from storage section 3 and expands it into RAM 2, and judges whether the similarity related to newly acquired new film image data d1 is higher or not than the similarity related to similarity information included in the associating information, based on similarity level judging program 3d. (Step S14)

On the step S14, when the similarity related to new film image data d1 is judged to be higher than the similarity related to similarity information included in associating information (Step S14; higher), CPU 1 reads out associating information revising program 3e from storage section 3 and expands it into RAM 2 and revises the associating information so that the association degree between new film image data d1 and print image data d2 is higher according to associating information revising program 3e (Step S15). Thereby, when similarity image display instruction mark B1 is selected, display order of film image G1 to be displayed on electronic album image area G, instead of print image G2, is changed.

As mentioned above, based on the judgment result of similarity between film image data d1 and a print image data d2, similarity information related to the similarity between film image data d1 and print image data d2 is generated, and based on the generated similarity information, associating information which associates print image data d2 with film image data d1 similar to this print image data d2 is generated, so that it is possible to control the image data stored in image database 31 properly based on the generated associating information. That is, because it is possible to acquire image data from both print images G2 and films, which are users' common preservation forms of images, print image data d2 and film image data d1 can be stored in image database 31 to be associated with each other. On the other hand, when the similarity related to new film image data d1 is judged to be higher than the similarity related to the similarity information associated with association information in advance, associating information is revised so that the association degree between new film image data d1 and print image data d2 is higher, therefore, the higher the similarity of film image data d1 to print image data d2 is, the higher the association degree of the film image data d1 may be made, which makes it possible to arrange image data more properly in image database 31.

Accordingly, when the user uses film image data d1 or print image data d2, the user can use favorably the other image data, which is associated with the image data being used, based on associating information. Thereby, a deletion of image data by mistake, which occurred in a conventional technique for preventing double registration can be eliminated and image data can be arranged properly in image database 31

When similar image display instruction mark B1 displayed on display section 6 is touched based on user's prescribed operation, images related to film image data d1 associated with print image data d2 can be displayed on the display section 6. Specifically the quality of print images G2 on album pages generally tends to be deteriorated by aging, however on the other hand, the quality deterioration of film images are slight and films often keep image information the image quality of which can be improved through digitization. Besides, although print image d2 can be restored by an application of a prescribed image processing, it is difficult to achieve a high quality due to a limitation by reason of a noise increase and so on. Therefore, an image which is similar to print image G2 and related to film image data d1 evaluated as a high quality image, can be displayed on display section 6 and images required by the user can be provided in the same order as in the album.

This invention should not be limited to the embodiment mentioned above and various improvements or design changes can be applied without departing from the spirit and scope of this invention.

For example, according to the above embodiment, although print scanner 5 is exemplified as the second image information acquiring device, the invention is not limited to this and can be a photographing apparatus such as a digital camera which photographs albums and converts the optical images into image signals. In this case, the converted image signals are divided so that each division may correspond to each print image G2 to make print image data d2 for respective images. At this point, there is a possibility of occurrence of, for example, a barrel-shaped distortion on the photographed image, therefore, when template matching is carried out between images for similarity determination, it is preferable to carry out the matching in low frequency space area of the image or to apply image processing in advance so as to remove distortion which may occur on the image, instead of a direct template matching to the image. As the section of removal of the distortion, for example, there is given a method to read a grid chart and to carry out a coordinate transformation so that the distortion of the grid is corrected to get an accurate grid.

According to the above embodiment, film image data d1 are exemplified as medium image information and film scanner 4 is composed as a section of first image information acquisition, however, they are not exclusive and, for example, recorded image data which are generated by a digital camera and are stored in a prescribed memory card composed by semiconductor memory can be employed. Besides through a prescribed communication section, which may be wired or wireless, recorded image data may be acquired as medium image information.

Further, according to the above embodiment, the associating information is stored in prescribed memory area such as "Album dir." in storage section 3, however, it is not always stored there and it may also be stored by being written into one of the two pieces of image data associated with each other without being limited to the aforementioned structure.

In addition to this, associating information which includes similarity information is generated in the embodiment stated above, however, the composition is not always like this, and is acceptable if only associating information is associated with similarity information.

Image control apparatus 100 may be composed so that PC, film scanner 4 and print scanner 5 are connected through a prescribed data communication cable without a limitation to the composition exemplified above.

Further, according to the above embodiment, it is composed so that the similarity between image data is judged, when all print image data d2 have been acquired after the acquisition of film image data d1, however, the composition is not always like this and a similarity determination may be carried out for each of acquired print image data d2. Regarding the acquisition order of film image data d1 and print image data d2, either can be acquired first or they can be acquired at the same time.

The electronic album created by image control apparatus 100 may be portable by being stored in a prescribed record medium such as CD-R or DVD-R and can enhance the value of the electronic album.

What is claimed is:

1. An image control apparatus having an image database configured to store plural pieces of image information, for controlling the plural pieces of image information stored in the image database, the image control apparatus comprising:
   a second image information acquiring device for acquiring print image information from a print recording medium, on which an image is printed;
   a first image information acquiring device for acquiring medium image information from a recording medium different from the print recording medium;
   a similarity determining section for determining a similarity through comparison between the print image information acquired by the second image information acquiring device and the image information acquired by the first image information acquiring device;
   a similarity information generating section for generating similarity information related to similarity between the medium image information and the print image information based on the similarity determined by the similarity determining section;
   an associating information generating section for generating associating information to associate the print image information with the medium image information, based on, the similarity information generated by the similarity information generating section; and
   displaying section for displaying images related to the print image information, stored in the image database, in an electronic album screen on the displaying section;
   wherein the displaying section is configured to display a similar image display instruction mark for instructing to display an image related to the medium image information associated with the print image information;
   wherein when the similar image display instruction mark is operated, the display section displays the image related to the medium image information corresponding to the similar image display instruction mark.

2. The image control apparatus of claim 1, further comprising:
   a similarity level judging section for judging which similarity is higher, a first similarity, already determined by the similarity determining section, between a first medium image information and a first print information, or a second similarity between a newly acquired second medium image information and the first print information; and
   an associating information revising section for revising the associating information so that an associating degree between the second medium image information and the first print image information becomes higher than associating degree between the first medium image information and the first print image information, when the second similarity is judged to be higher than the first similarity.

3. The image control apparatus of claim 2, wherein the image database comprises a medium image memory area to store plural pieces of the medium image information, acquired by the first image information acquiring device, divided based on each directory of the database,
   and wherein, the displaying section is configured to display plural medium images display instruction mark for instructing to display images related to the plural pieces of the medium image information stored in the medium image memory area of a directory, when the medium image memory area stores the medium image information associated with the print image information whose image is displayed in the electronic album screen.

4. The image control apparatus of claim 1, wherein the image database comprises a medium image memory area to store plural pieces of the medium image information, acquired by the first image information acquiring device, and divided based on each directory of the database,
   and wherein, the displaying section is configured to display plural medium images display instruction mark for instructing to display images related to the plural pieces of the medium image information stored in the medium image memory area of a directory, when the medium image memory area stores the medium image information associated with the print image information whose image is displayed in the electronic album screen wherein when the plural medium images display instruction mark is operated, the display section displays the images related to the medium image information stored in the medium image memory area of the directory.

5. An image controlling method for controlling plural pieces of image information stored in an image database by using an image control apparatus comprising a second image information acquiring device for acquiring print image information from a print recording medium on which an image is printed, and a first image information acquiring device for acquiring medium image information from a recording medium different from the print recording medium, and the image database for storing the first image information and the second image information, the image controlling method comprising:

determining a similarity through comparison between the print image information acquired by the second image information acquiring device and the medium image information acquired by the first image information acquiring device;

generating similarity information related to similarity between the medium image information and the print image information based on the similarity determined by the similarity determining section;

generating associating information to associate the print image information with the medium image information, based on the similarity information generated by the similarity information generating section;

displaying images related to the print image information, stored in the image database, in an electronic album screen on the displaying section;

displaying a similar image display instruction mark for instructing to display an image related to the medium image information associated with the print image information; and displaying the image related to the medium image information corresponding to the similar image display instruction mark, when the similar image display instruction mark is operated.

6. The image control method of claim 5, further comprising the steps of:

judging which similarity is higher, a first similarity, already determined by the similarity determining section, between a first medium image information and a first print information, or a second similarity between a newly acquired second medium image information and the first print information; and revising the associating information so that an associating degree between the second medium image information and the first print image information becomes higher than an associating degree between the first medium image information and the first print image information, when the second similarity is judged to be higher than the first similarity.

7. The image control method of claim 6, wherein the image database comprises a medium image memory area to store plural pieces of the medium image information, acquired by the first image information acquiring device, and divided based on each directory of the database and the image control method further comprising the step of:

displaying plural medium images display instruction mark for instructing to display images related to the plural pieces of the medium image information stored in the medium image memory area of a directory, when the medium image memory area stores the medium image information associated with the print image information whose image is displayed in the electronic album screen; and displaying the images related to the medium image information stored in the medium image memory area of the directory, when the plural medium images display instruction mark is operated.

8. A computer-readable recording medium stored thereon a program for realizing an image control on an image control apparatus comprising a second image information acquiring device for acquiring print image information from a print recording medium on which an image is printed, a first image information acquiring device for acquiring medium image information from a recording medium different from the print recording medium, and an image database for storing the first image information and the second image information, the image control comprising the functions of:

determining similarity through comparison between the print image information acquired by the second image information acquiring device and the image information acquired by the second image information acquiring device;

generating similarity information related to similarity between the medium image information and the print image information based on the similarity determined by the similarity determining section;

generating associating information to associate the print image information with the medium image information, based on the similarity information generated by the similarity information generating section; and displaying images related to the print image information, stored in the image database, in an electronic album screen on the displaying section;

displaying a similar image display instruction mark for instructing to display an image related to the medium image information associated with the print image information; and displaying the image related to the medium image information corresponding to the similar image display instruction mark, when the similar image display instruction mark is operated.

* * * * *